United States Patent [19]

Kuffer

[11] 4,087,162
[45] May 2, 1978

[54] FULL POWER OPTICAL SYSTEM WITH DISPLACED BEAM PARTS

[75] Inventor: Fernand Bannie Kuffer, Brea, Calif.

[73] Assignee: General Dynamics Corporation, Pomona, Calif.

[21] Appl. No.: 725,592

[22] Filed: Sep. 22, 1976

Related U.S. Application Data

[63] Continuation-in-part of Ser. No. 533,906, Dec. 18, 1974, abandoned.

[51] Int. Cl.$^2$ .................... G02B 5/08; G02B 27/14
[52] U.S. Cl. ................................ 350/299; 350/172
[58] Field of Search ............. 350/299, 292, 171, 172, 350/169, 306, 320, 128, 126, 27, 55

[56] References Cited

U.S. PATENT DOCUMENTS

| | | | |
|---|---|---|---|
| 1,338,582 | 4/1920 | Morris et al. | 350/306 |
| 2,151,236 | 3/1939 | Schwartz et al. | 350/126 |
| 2,152,224 | 3/1939 | Thomas | 350/172 |
| 3,375,753 | 4/1968 | Ramsell | 350/299 |
| 3,536,922 | 10/1970 | Ito | 350/169 |
| 3,648,050 | 3/1972 | Koo | 350/171 |
| 3,877,802 | 4/1975 | Greenspan | 350/299 |

FOREIGN PATENT DOCUMENTS

| | | | |
|---|---|---|---|
| 697,039 | 10/1940 | Germany | 350/172 |

*Primary Examiner*—Jon W. Henry
*Attorney, Agent, or Firm*—Neil F. Martin; Edward B. Johnson

[57] ABSTRACT

A system for optically dividing an incident beam into segments and processing it through optics with obscurations, while maintaining the full power of the incident beam. The system utilizes a combination of mirror sets with the processing optics. The mirror sets incorporate spaced parallel reflecting surfaces nominally oriented at 45° to the incident beam. The processing optics are of the type with optical member support structure, or obscuring secondary mirrors. The distance along the incident beam axis that the two surfaces of the mirror sets are separated determines the separation between the beam halves reflected from the first mirror set, and the beam quadrants reflected from the second mirror set. This is spaced to miss the structure or secondary obscuration.

13 Claims, 8 Drawing Figures

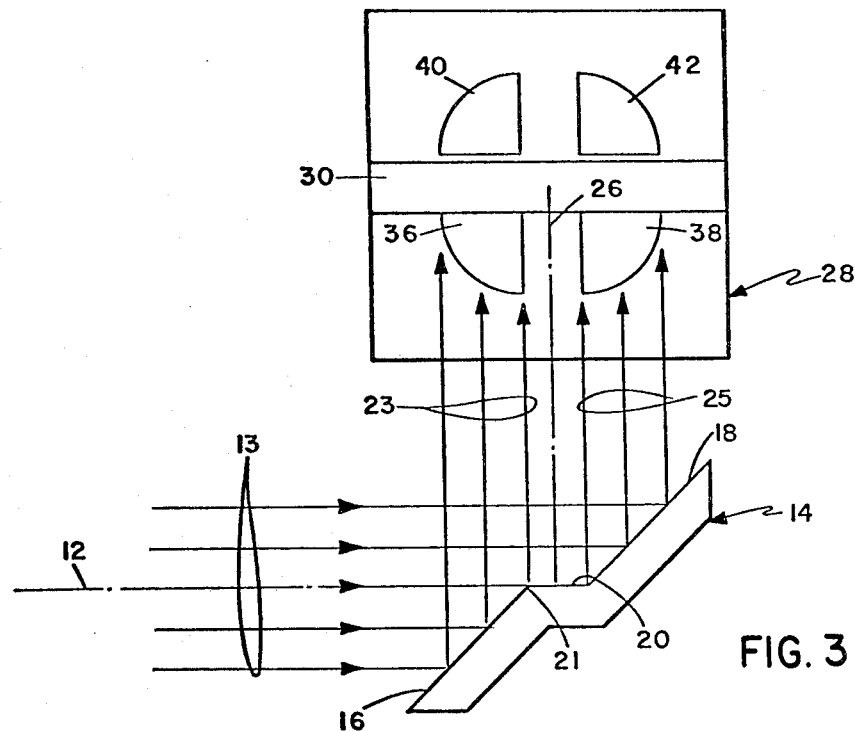
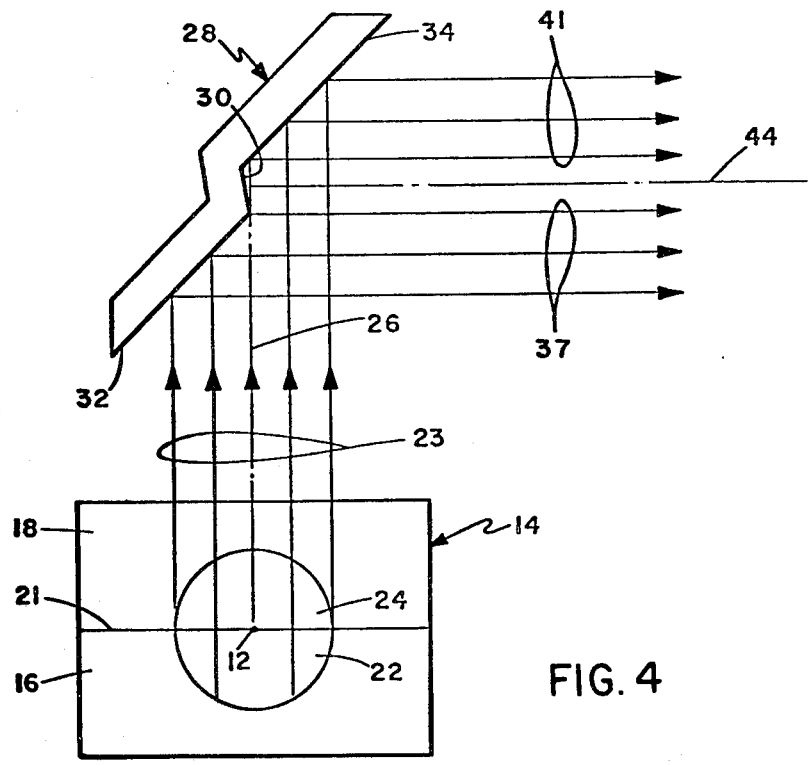

FULL POWER OPTICAL SYSTEM WITH DISPLACED BEAM PARTS

CROSS REFERENCE TO RELATED APPLICATION

The application is a continuation-in-part of application Ser. No. 533,906 in the name of Fernand Bannie Kuffer filed Dec. 18, 1974, now abandoned, and entitled "Beam Division Optical System".

BACKGROUND OF THE INVENTION

There are numerous applications in existing devices for light projecting and light receptive optical systems wherein it is desirable to maintain the power or quality of a beam of light. According to conventional optical systems, light beams must be processed by off-axis optics to eliminate both supporting structure and other obscurations. Off-axis optics with the requirement for asymetrical optical elements, necessarily increase the size of the system since the beam is deflected from the original axis. Additionally, in order to maintain adequate beam quality, specially designed, complex, high precision, optical components must be employed, substantially increasing the cost of the optical system. Direct expansion done in a coaxial system requires optical components to be on-axis. This means that the necessary supporting structure for the optical components must pass through the beam, thereby reducing the total power delivered. Where the supporting structure can be eliminated from the beam, such as the Coude-Coelostat, a portion of the beam is reflected back in its original direction thus losing power. This is undesirable. The term "optical structure" as used hereinafter is intended to include optical components and supporting structure that would normally block or obscure part of the beam power.

Therefore, it is desirable to have an optical system capable of producing a non-annular beam, that transmits the full beam power without off-axis optics, or other expensive optical elements. Such a system is particularly desirable where reflected back beams would degrade system performance.

SUMMARY OF THE INVENTION

An exemplary embodiment of the invention overcomes the disadvantages associated with prior art light beam systems through the use of two configured mirror sets with the processing optics. As used herein, the term "light beam" or "beam" is intended to include incident electromagnetic radiation in the spectrum susceptible to processing by optical elements. Each mirror set has a reflecting face that is divided into two spaced surfaces. The two reflecting surfaces are joined by an optically inactive surface. The length of the inactive surface determines the spacing of the beam segments, as will appear more fully hereinafter. The segmented beam then travels through the processing optics at full power without encountering structure or obstructions.

Under some conditions, it may be desirable to use separate mirrors which are not joined.

In the exemplary embodiment, the incident beam of light, which may be considered to be circular in cross-section for purposes of description, is made to fall upon a first of the mirror sets along a first optical axis that is parallel to the plane of, and lies along, the inactive surface and intersects the plane of each of the reflecting surfaces at an angle of 45°. A first part of the beam in this case comprising half of the incident beam, is reflected by the first reflective surface, and a second part of the incident beam, comprising the second half of the incident beam will be reflected by the second reflecting surface. The first and second parts of the beam are semi-circular in cross-section with a space between and define a second optical axis which is oriented at 90° to the first optical axis.

The first and second parts are made to be incident upon a second mirror set, configured in a like manner to the first, and arranged such that the inactive surface lies along the second optical axis. The first and second reflecting surfaces are at 45° to the second optical axis and are rotated about the second optical axis. Thus, each semi-circular part of the first and second beam parts is split to form quadrants. The four quadrants define a third optical axis which is nominally oriented at 90° to the first and second optical axis. The quadranted beam is then utilized by optical devices as required for the particular application. These optical devices are arranged such that any supporting structure and obscuring members will lie between the quadrants and therefore will not degrade the power of the beam.

BRIEF DESCRIPTION OF THE DRAWINGS

FIG. 3 is a diagram of the two prisms illustrating the beam paths of the quadrants.

FIG. 4 is a view as taken from the left hand side of FIG. 3.

DESCRIPTION OF THE PREFERRED EMBODIMENT

Figure 1:
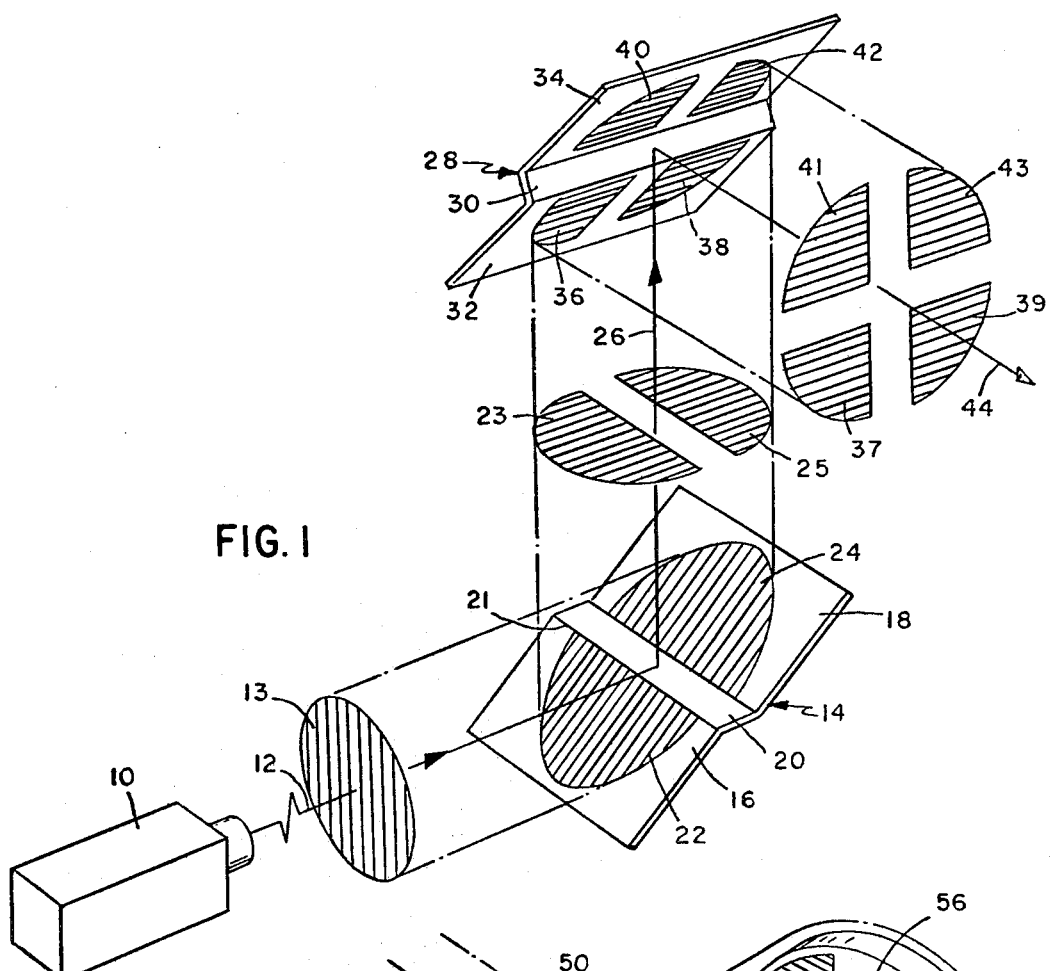
FIG. 1 is a diagrammatic view of the optical system for dividing a beam into four quadrants.

Referring now to FIG. 1, the layout of a typical installation for segmenting the beam is illustrated. A laser 10 produces a collimated beam of light 13 which is incident upon mirror set 14 arranged such that the reflective surfaces 16 and 18 are at 45° to the incident beam with the optically inactive surface 20 parallel to the axis 12 of beam 13. For purposes of illustration, the incident beam 13 is assumed to be circular in cross-section and thus the projection of this circular cross-section on the mirror set 14 is illustrated by the first and second illuminated areas 22 and 24. The beam is reflected 90° from the incident beam 13 as first and second semi-circular beam parts 23 and 25. The beam parts 23 and 25 are parallel to the second optical axis 26.

Figure 2:
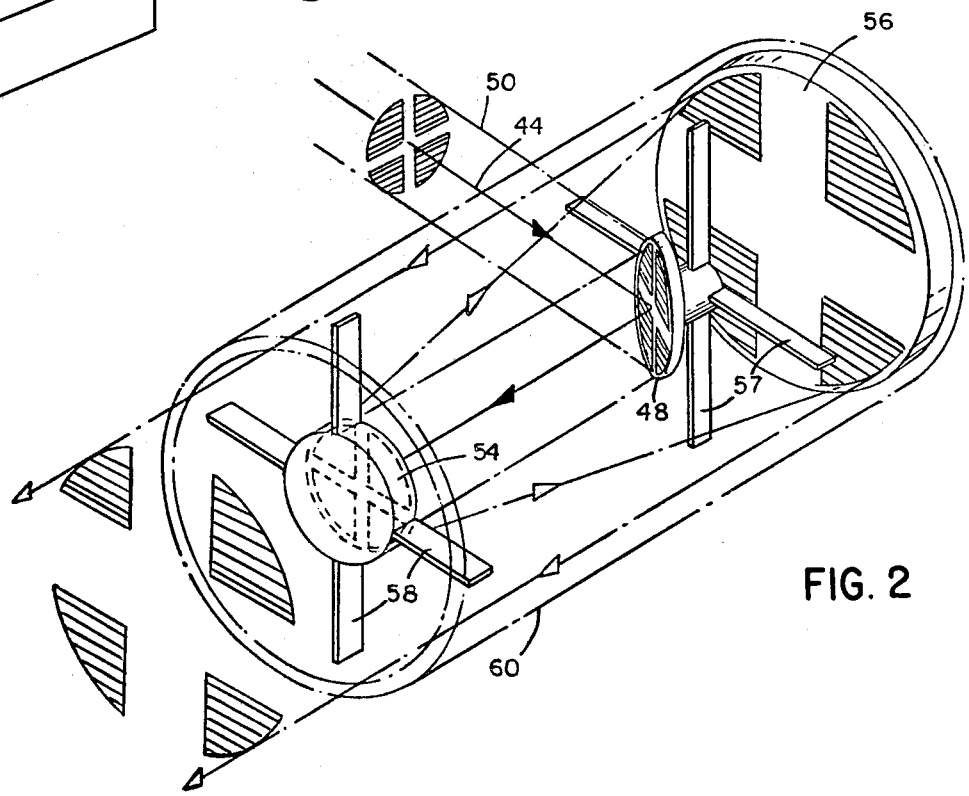
FIG. 2 is a longitudinal sectional view of the application to a typical Coude-Cassegrain type telescope. It shows the divided beam projection, structural members and obscuring secondary mirror.

The second mirror set 28 is rotated 90° from the first mirror set 14 and with its optically inactive surface 30 along and below parallel with the second optical axis 26. Accordingly, the first and second beam parts 23 and 25 are each divided in half with a first half of each part falling on the reflective surface 34 and a second half of each part falling on the reflective surface 32. Thus, the beam is divided into quadrants 36 and 38 on the reflective surface 32; and quadrants 40 and 42 on the reflective surface 34. The quadrant components are reflected along the third optical axis 44 oriented 90° from the second optical axis to the utilization device such as the Coude-Cassegrain type telescope 46, continuing the path in FIG. 2.

The telescope 46 is configured as a projector with a first planar mirror 48 in the Coudé position. The rays 50 are representative of the path taken by the quadrants 41, 43, 39 and 37. The rays are made divergent by a convex secondary mirror 54 and are made parallel by the concave primary 56. The mirror 48 is supported within the telescope by supporting elements 57 and the mirror 54 by elements 58. The mirrors lie along the optical axis of the telescope and accordingly, the supporting structure must pass from the optical axis to the frame structure 60 of the telescope. However, because of the configuration of the quadranted beam incident along the third optical axis 44, the support elements 57 and 58 pass between the beam quadrants and the mirrors 48 and 54 are in the open center. Accordingly, the full power of the original beam is retained.

Although mirror sets 14 and 28 are shown as having the separate reflective surfaces joined, it may be desirable to use separate reflective surfaces which are not joined, under some circumstances. Where the reflective surfaces are joined, the inactive surface may be parallel to the incident optical axis as in mirror set 14 or below parallel with respect to the incident optical axis as in mirror set 28.

Referring now to FIGS. 3 and 4, the detailed configuration for the mirror sets 14 and 28 is illustrated. The mirror sets as illustrated incorporate front surface reflections; however, back surface reflections may also be utilized as will be understood by those skilled in the art. Surface coatings on the front surfaces minimize interferring reflections.

The first reflective surface 16 of the mirror set 14 is positioned to intercept ½ of the light in beam 13 incident upon the mirror at a 45° angle along optical axis 12. Accordingly, the linear edge 21 intersects the optical axis 12 where it is desired that the beam be divided exactly in half. The remaining half of the beam 13 passes over the parallel optically inactive surface 20 and is reflective from the reflective surface 18. Thus, the first part 23 of the reflective beam is spaced from the second part 25 by a distance equal to the length of the inactive surface 20 as is illustrated in FIG. 3. Similarly, the mirror set 28 is effective to divide the beam parts 23 and 25 into the illuminated areas 36, 38, 40 and 42. The beam quadrants 37 and 41 from the illuminated areas 36 and 40 are thus spaced from each other by a distance equal to the projected length along the optical axis 26 of the inactive surface 30, as is illustrated in FIG. 4. The beam quadrants 29 and 43 from the illuminated areas 38 and 42 are also so spaced, as is illustrated in FIG. 1.

It should be understood that curved structure can be accommodated using curved edges in lieu of the linear edge as in edge 21. Further, a nonorthogonal configuration may be accommodated by having the second mirror set 28 reflect at other than 90° to the second axis 26. When division of the beam is other than equal, the second mirror set 28 is translated from the second axis 26. The foregoing is applicable to the first mirror set 14 as well.

Referring now to FIGS. 5, 6, 7 and 8 there are illustrated alternative embodiments demonstrating the scope of applications for the use of the invention, to accommodate other processing optics configurations.

Figure 5:
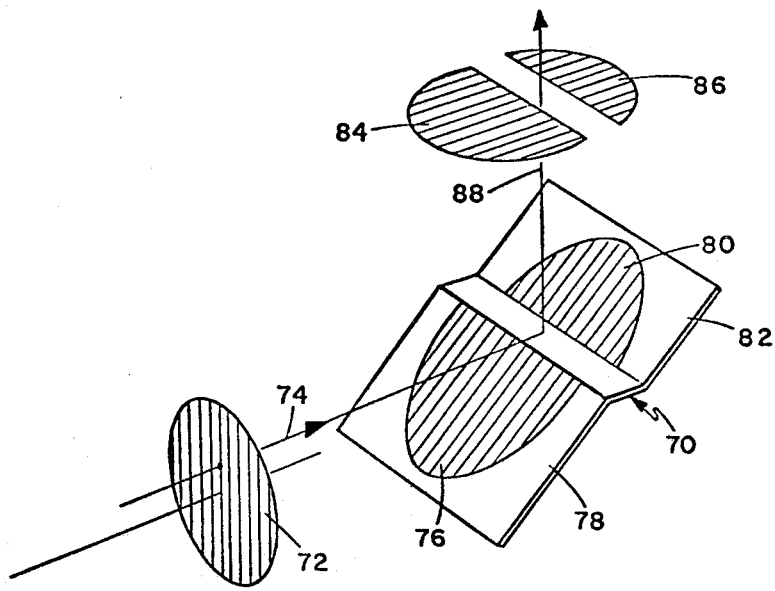
FIG. 5 is a sectional view showing the use of a single mirror set to divide the beam into two segments.

FIG. 5 illustrates a mirror set 70 utilized for division of an incident beam 72 into two unequal parts. The incident beam 72 is displaced from the optical axis 74 resulting in a larger illuminated area 76 on the reflective surface 78, than the illuminated area 80 on the reflective surface 82. The unequal beam parts 84 and 86 are reflected along a path parallel to the second optical axis 88.

Figure 6:
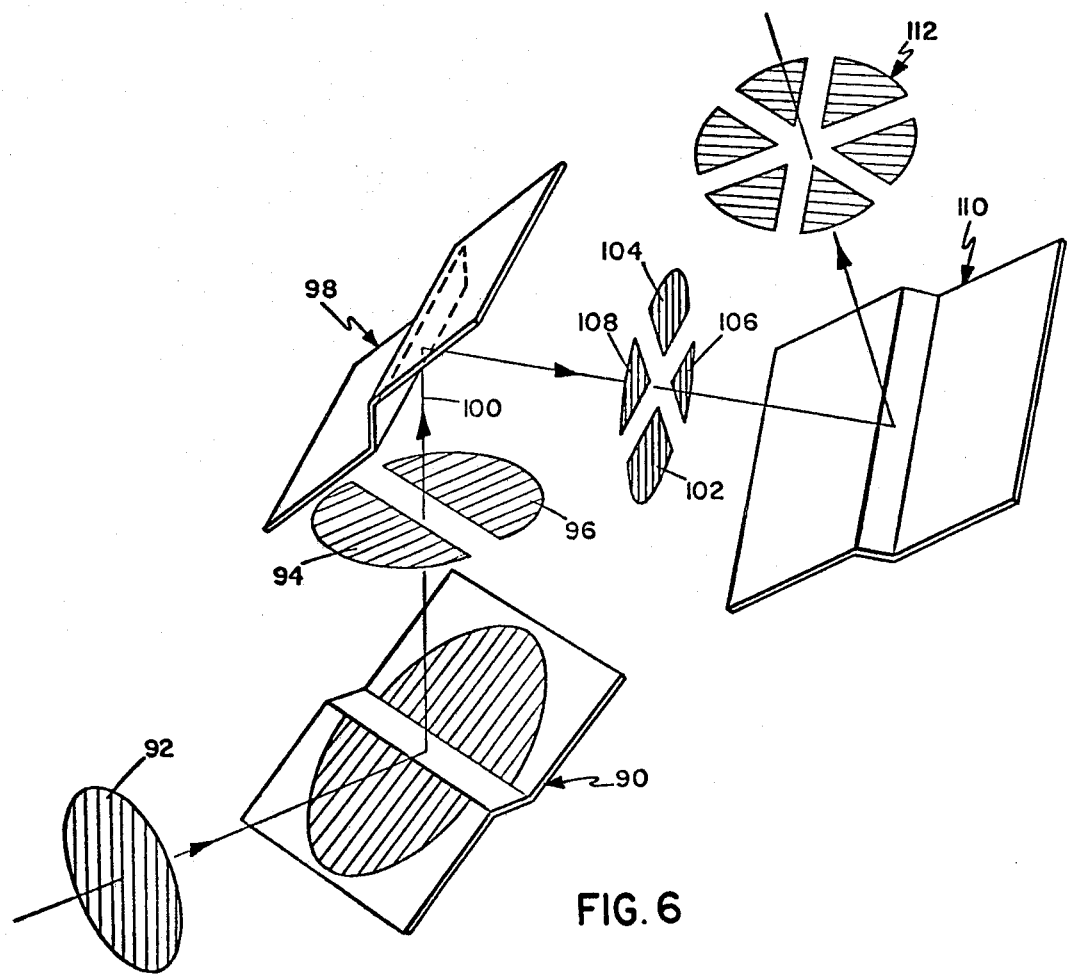
FIG. 6 is a sectional view showing the use of mirror sets to divide the beam into six segments.

FIG. 6 shows a configuration for three mirror sets which are configured for the purpose of dividing an incident beam into six equal segments. The first mirror set 90 divides the incident beam 92 into two equal parts 94 and 96. The beam parts 94 and 96 are incident upon a second mirror set 98 which is rotated about the optical axis 100 30° counterclockwise from the orthogonal relationship. This results in the division of beam parts 94 and 96 into four beam parts 102, 104, 106 and 108. Beam parts 102 and 104 have twice the angular extent of beam parts 106 and 108. The four beam parts are then incident upon third mirror set 100, rotated 30° from the orthogonal relationship. The mirror set 110 divides the beam parts 102 and 104 in half, but does not again divide the beam parts 106 and 108, thereby producing six equal beam parts in the reflected beam 112.

Figure 7:
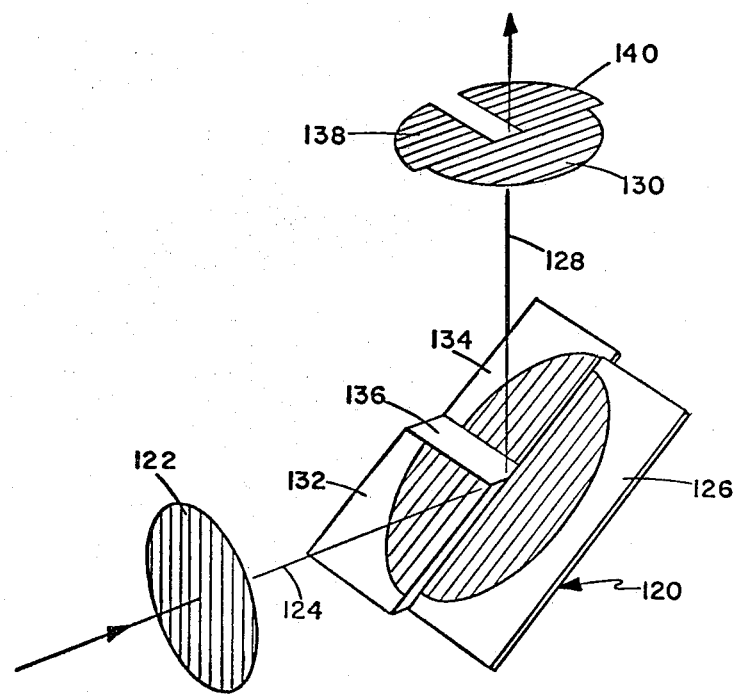
FIG. 7 is a sectional diagram of a partial separating mirror set.

Referring now to FIG. 7, there is illustrated a mirror set 120 which is configured to divide only a portion of the incident beam into beam parts. The beam 122 incident upon the mirror set 120 along optical axis 124 falls in part on plane mirror 126. The part falling on plane mirror 126 is reflected along second optical axis 128 as semi-circular beam part 130. The second part of incident beam 122 is divided on the mirror set 120 between the lower reflective surface 132 and the upper reflective surface 134. The reflective surfaces are separated by inactive surface 136. The separated surfaces result in beam parts 138 and 140 which are then reflected parallel to the second optical axis 128.

Figure 8:
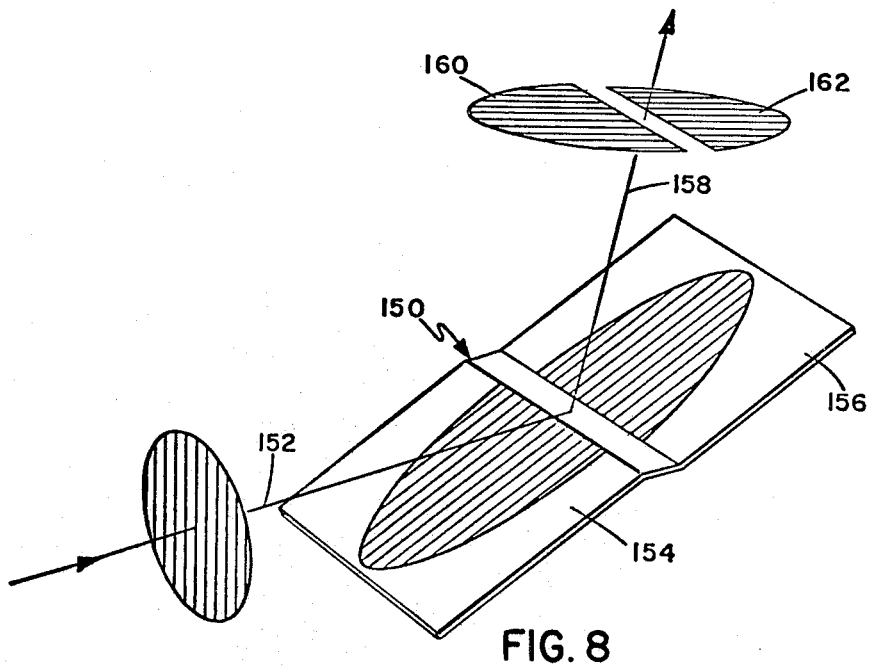
FIG. 8 shows one mirror set to deflect the beam at an angle other than 90°.

FIG. 8 illustrates the use of a mirror set 150 with reflective surfaces 154 and 156. The surfaces are oriented at 30° to the incident optical axis 152, rather than the more conventional 45°. This orientation results in a second optical axis 158, which is inclined 30° from the orthogonal. The resulting beam parts 160 and 162 are projected parallel to the second optical axis 158.

Having described my invention, I now claim:

1. An optical system comprising:
   first reflective means for receiving a beam of light incident upon said reflective means along a first optical axis,
   a second optical axis angularly displaced from said first optical axis,
   said first reflective means comprising spaced reflective surfaces for reflecting substantially all of said beam incident upon said surfaces as first and second beam parts,
   said first and second beam parts being reflected parallel to one another along said second optical axis and being axially spaced from one another with respect to said first optical axis,
   a third optical axis angularly displaced from said second optical axis,
   a second reflective means positioned on said second optical axis and comprising spaced reflective surfaces for reflecting, in spaced portions, substantially all of said first and second beam parts incident on said second reflective means along said third optical axis, a set of processing optics positioned to intercept said portions of said first and second beam parts, said processing optics having a frame structure and an optical structure, said optical structure being positioned on said frame structure between the position of said beam parts, means for redirecting said beam parts after said beam parts have passed said frame structure to cause said beam parts to be incident upon said optical structure.

2. An optical system according to claim 1 wherein:

said first and second reflective means each comprise a first reflective planar surface lying on one side of the incident optical axis and having a terminal edge intersecting said optical axis, a second reflective planar surface parallel to said first reflective planar surface, said second reflective planar surface lying on the opposite side of said incident optical axis from said first reflective planar surface, said second reflective planar surface being axially displaced from said first reflective planar surface along said incident optical axis in the direction of said beam of incident light.

3. An optical system according to claim 2 wherein: said first and second reflective planar surfaces comprise front reflecting mirrors.

4. An optical system according to claim 1 wherein: said first, second and third optical axis are mutually perpendicular.

5. An optical system according to claim 4 wherein: said third optical axis is rotated 90° about said second optical axis from the direction of said first optical axis.

6. An optical system according to claim 2 including: a planar reflective means adjacent and parallel to said first and second reflective surfaces.

7. An optical system according to claim 1 including: a fourth optical axis, a third reflective means positioned on said third optical axis for reflecting light along said fourth optical axis.

8. In a coaxial optical system incorporating processing optics having on-axis optical elements wherein the on-axis optical elements incorporate supporting elements extending from the on-axis optical elements through the nominal beam path to the surrounding structure, and wherein the improvement comprises:

first reflective means for receiving a beam of light incident upon said reflective means along a first optical axis and for reflecting substantially all of said beam incident on said first reflective means as first and second beam parts along a second optical axis angularly displaced from said first optical axis, said first and second beam parts being reflected parallel to one another along said second optical axis and being axially spaced from one another with respect to said first optical axis by a sufficient distance to accommodate supporting elements of on-axis optical elements for permitting said supporting elements to pass between said beam parts, a third optical axis angularly displaced from said second optical axis, second reflective means positions on said second optical axis and for reflecting in spaced segments substantially all of said first and second beam parts incident on said second reflective means along said third optical axis to said processing optics, said first and second reflective means each comprising a first planar reflective surface lying on one side of the incident optical axis and having a terminal edge intersecting said optical axis, a second planar reflective surface parallel to said first planar reflective surface, said second planar reflective surface lying on the opposite side of said incident optical axis from said first planar reflective surface, said second planar reflective surface being axially displaced from said first planar reflective surface along said incident optical axis in the direction of said beam of incident light, said segments reflected from said first planar reflective surface of said second reflective means being axially spaced along said second optical axis from said segments reflected from said second planar surface by a sufficient distance to accommodate supporting elements of said on-axis optical elements and for permitting said supporting elements to pass between said beam segments, means for redirecting said beam segments after said segments pass said supporting elements to cause said beam segments to be incident upon said on-axis optical elements.

9. An optical system according to claim 8 comprising: a fourth optical axis, a third reflective means positioned on said third optical axis for further dividing said segments from said second reflective means and for reflecting the resulting further divided segments along said fourth optical axis, and said third reflective means comprising a first planar surface lying on one side of the incident optical axis and having a terminal edge intersecting said optical axis, a second planar surface parallel to said first reflective planar surface, said second planar reflective surface lying on the opposite side of said incident optical axis from said first planar reflective surface and being axially displaced along said incident optical axis in the direction of said beam of incident light.

10. An optical system according to claim 8 wherein: said first and second reflective planar surfaces comprise front reflecting mirrors.

11. An optical system according to claim 8 wherein: said first, second and third optical axis are mutually perpendicular.

12. An optical system according to claim 11 wherein: said third optical axis is rotated 90° about said second optical axis from the direction of said first optical axis.

13. A method of using an optical system characterized by:

first reflective means for receiving a beam of light incident upon said reflective means along a first optical axis and for reflecting substantially all of said beam incident on said first reflective means as first and second spaced beam parts, second reflective means for reflecting substantially all of each incident beam part as first and second spaced segments, and further characterized by:

processing optics incorporating on-axis optical structure, wherein the method comprises the steps of:

positioning said first reflective means to receive said beam of light,
positioning said second reflective means to intercept said first and second beam parts,
positioning said processing optics to receive said segments with said on-axis optical structure between said beam segments, and
redirecting said segments after said segments pass said on-axis optical structure to cause said segments to be incident upon said on-axis optical structure.

* * * * *